United States Patent
Parchem et al.

[11] Patent Number: 5,745,119
[45] Date of Patent: Apr. 28, 1998

[54] COLOR DATA CONVERSION USING REAL AND VIRTUAL ADDRESS SPACES

[75] Inventors: John M. Parchem, Seattle; Robert M. Fries, Redmond, both of Wash.

[73] Assignee: Microsoft Corporation, Redmond, Wash.

[21] Appl. No.: 571,358

[22] Filed: Dec. 13, 1995

[51] Int. Cl.$^6$ .................................................. G06T 11/00
[52] U.S. Cl. .................................................. 345/431
[58] Field of Search ........................ 395/131, 133, 395/509, 515, 516; 358/445

[56] References Cited

U.S. PATENT DOCUMENTS 5,359,694  10/1994  Concordel ........................... 358/445

Primary Examiner—Almis R. Jankus
Attorney, Agent, or Firm—Ronald M. Anderson

[57] ABSTRACT

A method and system for accessing image data in a plurality of different color formats. The image data are stored in a system memory (120) in one of the color formats. The method and system enable an access or request to load image data in a different color format from an address in a color conversion address space, which comprises an alternate memory space. Pixel color data in the color conversion address space have a corresponding address for data in the other color format that is stored in system memory. The corresponding address is determined by subtracting a predefined offset from the conversion memory address. Differences in the size of the color format data for the requested pixels are accommodated by applying an appropriate factor to determine the system memory address. Color data for the pixels stored at the system memory address are converted to the desired color format and the converted color format data are delivered to the processor for use and stored in a buffer for subsequent access as required.

22 Claims, 3 Drawing Sheets

COLOR DATA CONVERSION USING REAL AND VIRTUAL ADDRESS SPACES

FIELD OF THE INVENTION

The present invention generally relates to the display of an image on a display screen, and more specifically, to a method and system that enable image data saved in memory in one format to be converted to a different format.

BACKGROUND OF THE INVENTION

The relatively wide bandwidth for distributing signals on a cable television network can be used for purposes other than simply distributing broadcast television signals. One of the ideas currently being developed and tested will permit subscribers to interact with a television program that is being viewed. For example, using a remote control as input device, the subscriber will be able to enter a vote on some issue. This system would also enable viewers of a show to determine how the plot of the show develops. Another use of such a system will be to enable a user to select pay-for-view movies, on demand, for viewing when the subscriber chooses, rather than in accord with a fixed timetable.

An interactive television interface will be required for input of any selection by the user, since a conventional television does not have the capability to produce a signal for transmission over the cable network. Because of its likely position atop a television receiver, such an interface has been referred to as a "set top box."

With the advent of such interactive television, it is likely that software application programs will be developed to implement an on-screen interface for prompting input by the viewer. Other types of software applications might also be run on a set top box. It is likely that the viewer will be given more control over the nature of the signal displayed on the screen, including the ability to modify the signal or to combine it with other signals such as those generated by a computer or other digital video source in a particular manner. Conventional television receivers do not currently have the capability to combine a broadcast signal from a television network (or the signal from a laser disc player or video recorder) with a digital graphics signal from a computer to produce a composite image that can be displayed on the television screen. To combine such signals, a set top box will be required that provides a composite display of various format video and digital graphic signals for input to the television.

Broadcast television signals in the U.S. have a format that conforms to the NTSC standard. When these signals are digitized, another standard, CCIR 601, defines the preferred digital representation or format of the signals. One of the digital color formats specified by the CCIR 601 standard is referred to as YCrCb 4:2:2. In this color format, the Y value indicates a pixel's luminance, the Cb value indicates the blue chrominance, and the Cr value indicates the red chrominance. To enable digital processing of the broadcast video signal by a set top box, the analog NTSC signal received by an antenna or conveyed by a cable system must be converted to digital image data. The digital image data corresponding to the broadcast signal image can then be combined with digital image data generated by the circuitry, if in the same format, within the set top box to produce a composite image on the screen.

In the YCrCb 4:2:2 digital color format specified by the CCIR 601 standard, the YCrCb pixels are each 16 bits wide. The format specifies the color of adjacent pixel pairs in an image. For each pixel pair, the data for the first pixel includes an 8-bit $Y_0$, value that applies only to the first pixel and an 8-bit Cb value that is shared between the pair of pixels. The data for the second pixel includes an 9-bit $Y_1$ value that applies only to the second pixel and an 8-bit Cr value that is shared between the two pixels of the pair.

In contrast to digitized broadcast video signals, a graphic digital signal generated by a computer typically is characterized by three primary color values—red, green, and blue (RGB). A computer generated graphic image is thus formed on a display screen by providing RGB color format signals that control the intensity of each primary color at each pixel on the screen. When it becomes necessary to produce a composite image that combines a digitized broadcast video signal with a computer generated graphic image, a conversion from one color format to the other may be required. For example, to apply a video texture map onto the surface of a digitally generated object in a composite image, the image data in the YCrCb color format must be converted to the RGB color format. Thus, the 16-bit wide YCrCb color format data for a pixel would be converted to 32-bit wide RGB color form at data. However, it may also be necessary to convert between various other combinations of color formats, and it may therefore be appropriate to include the capability to carryout several different types of color format conversions to produce a desired composite image on the display screen.

In the prior art, conversion from a color format of an image that is stored in memory to another format is typically accomplished by converting all of the image data to a different color format and storing the converted color image data in the memory so that it can be accessed by the processor. This conversion process requires time and uses substantial memory for both the original color format data and the converted color format data. It would be preferable to convert only the portion of the image data comprising a frame that is required by the processor, and to avoid storing converted data for an entire image frame in memory. However, since it is efficient for a processor to access converted color image data at a specific address in memory, it would be preferable for the converted color image to data to be accessed as if stored in memory. Currently, the prior art does not provide an efficient method to accomplish this task.

SUMMARY OF THE INVENTION

In accord with the present invention, a method is defined for selectively accessing image data in a plurality of different color formats. Tile method includes the step of storing image data having a first color format in a physical, real memory that has a defined range of addresses. An alternate memory space that is not directly mapped to a physical memory is also established. The alternate memory space has a defined range of addresses associated with each of the other of the plurality of different color formats except the first color format, and each of the defined range of addresses for the alternate memory space are outside the defined range of addresses of the real memory. An address for a portion of the image data that is within one of the defined range of addresses associated with a desired color format is specified—in the real memory if the first color format is desired, and in the alternate memory space if one of the plurality of color formats other than the first color format is desired.

Several further steps follow if the address that was specified is not within the real memory. As a function of the address that was specified in the alternate memory space, a corresponding address is determined in the real memory of the portion of the image data; and the portion of the image data stored at the corresponding address in the real memory is converted from the first color format to the desired color format, producing output data. However, if the address that was specified is in the real memory, the portion of the image data stored at the address specified, which is in the first color format, is retrieved as the output data. The output data that were requested are delivered (for use by a processor) and are stored in a buffer for subsequent access and use. Any output data produced by converting the portion of the image data stored in the real memory to a different color format will thereby appear to have been physically stored at the address that was specified in the alternate memory.

In a preferred embodiment of the present invention that is disclosed below, there are only a first and a second color format. Image data in the first color format are stored in the real memory, and image data in the second color format are nomninally "stored" in the alternate memory space.

Preferably, the first color format defines color using luminance, blue chrominance, and red chrominance (YCrCb) data, and said second color format defines color using red, green, and blue (RGB) data. In addition, the defined range of addresses in the alternate memory space in the preferred embodiment is substantially larger than the defined range of addresses in the real memory, because the image data in the first color format is more compact than the image data in the second color format. Also, if the desired color format is the second color format, a full cache block containing the portion of the image data in the real memory is preferably converted to the second color format to produce the output data. The buffer in which the output data are stored preferably comprises a processor interface buffer.

To determine the corresponding address of the portion of the image data in the real memory, the address of the portion of the image data in the alternate memory space is mapped to the real memory by applying a predefined offset. In addition, a multiplication factor is applied to the address of the portion of the image data in the alternate memory space before applying the predefined offset. This multiplication factor compensates and adjusts for differences in the size of the image data in the first color format and the second color format.

Another aspect of the present invention is directed to a system for selectively accessing image data in a plurality of different color formats. The system includes a physical, real memory for storing image data and machine instructions, and the real memory has a defined range of addresses. A processor, which is coupled to the memory and has a buffer, executes the machine instructions stored within the memory to implement functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4:
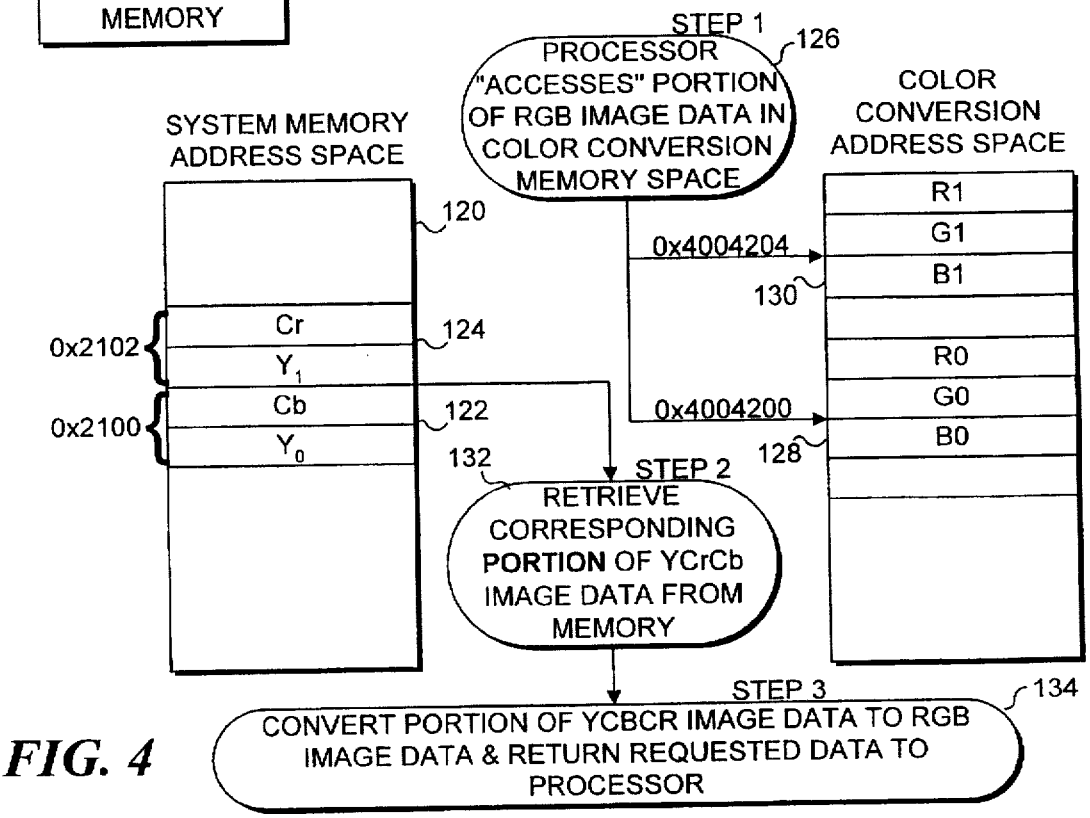
Figure 5:
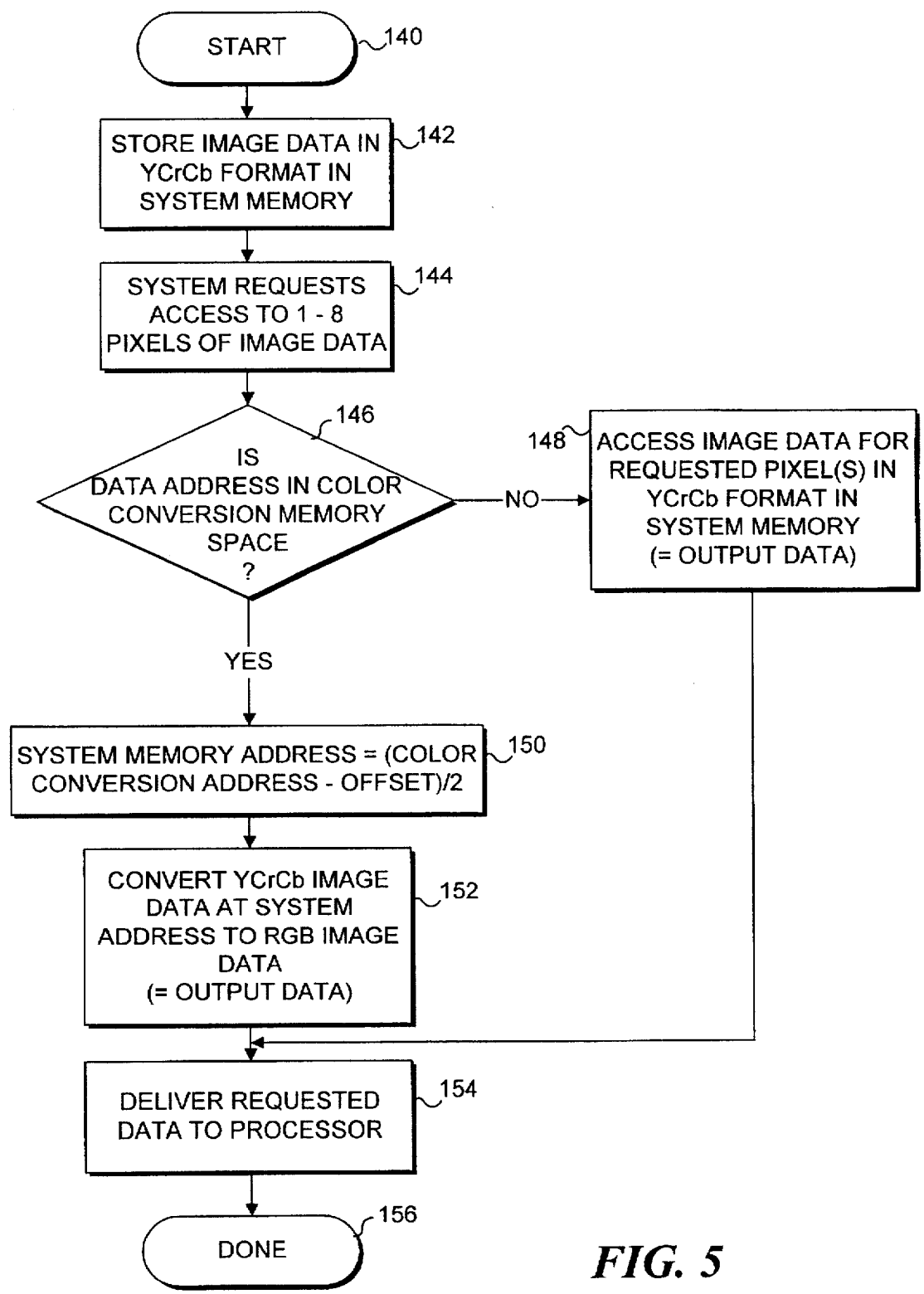

FIG. 4 is a block diagram showing the relationship between image data stored in one color format in system memory and corresponding image data in a different color format that can be accessed at an address in a color conversion space, in accord with the present invention; and FIG. 5 is a flow chart showing the logical steps for implementing the present invention so that image data can be accessed in different color formats at different memory addresses.

DESCRIPTION OF THE PREFERRED EMBODIMENT

Figure 1:
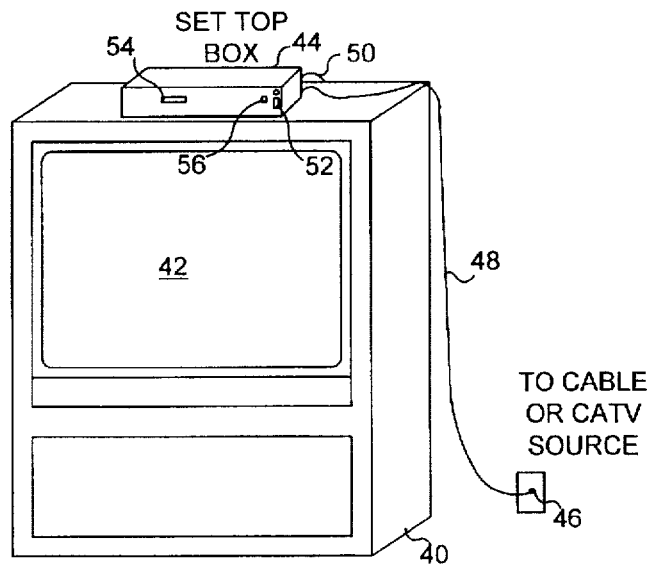
FIG. 1 is an isometric view of a television that is coupled to a set top box that implements the present invention.

The lack of efficiency in handling the conversion of digital image color data to a different format has led to the development of the present invention, which is embodied in a set top box 44, shown in FIG. 1. Set top box 44 is intended to be used with a television receiver or video monitor 40 having a conventional display screen 42. Although not shown in FIG. 1, it is also contemplated that the set top box might be used to process signals from several different video sources, such as a laser disc player or VCR, any of which may serve as an analog video data source. In addition, the set top box can be coupled to receive the signal from a rooftop antenna, satellite receiver, a cable system, or a community antenna television (CATV) system, as shown in FIG. 1. Signals can be transmitted from the set top box over the cable system to a suitable receiver (not shown) at a cable/network facility.

In FIG. 1, a line 48 connects a bi-directional (input/output) terminal (not shown) on the rear panel of set top box 44 to a corresponding cable outlet 46. A line 50 connects audio and video output terminals (not shown) on the back of the set top box to corresponding audio and video input terminals (not shown) on the back of television 40. The images produced by set top box 44 are displayed by television receiver 40 on display screen 42 and may include the images conveyed by a broadcast television signal, a video image produced by the set top box running a software program, and in accord with the present invention, a composite image produced by combining signals from two or more analog/digital image data sources, which may initially each use a different color format. Digital graphic objects are produced, for example, by circuitry within set top box 44. These graphic objects may include (but are not limited to) on-screen menus or dialog boxes generated in response to machine instructions comprising software application programs executed by set top box 44. Such software applications can be loaded into the memory of the set top box by inserting a read only memory (ROM) card in a program card slot 54, or could be downloaded via line 48 from a source connected to the cable system.

The set top box includes a power switch 52 and other controls that are not relevant to the present invention. Also included on the set top box is an infrared sensor 56 to enable it to receive input signals and commands from a user that are transmitted from an infrared light source contained in a remote control (not shown).

Figure 2:
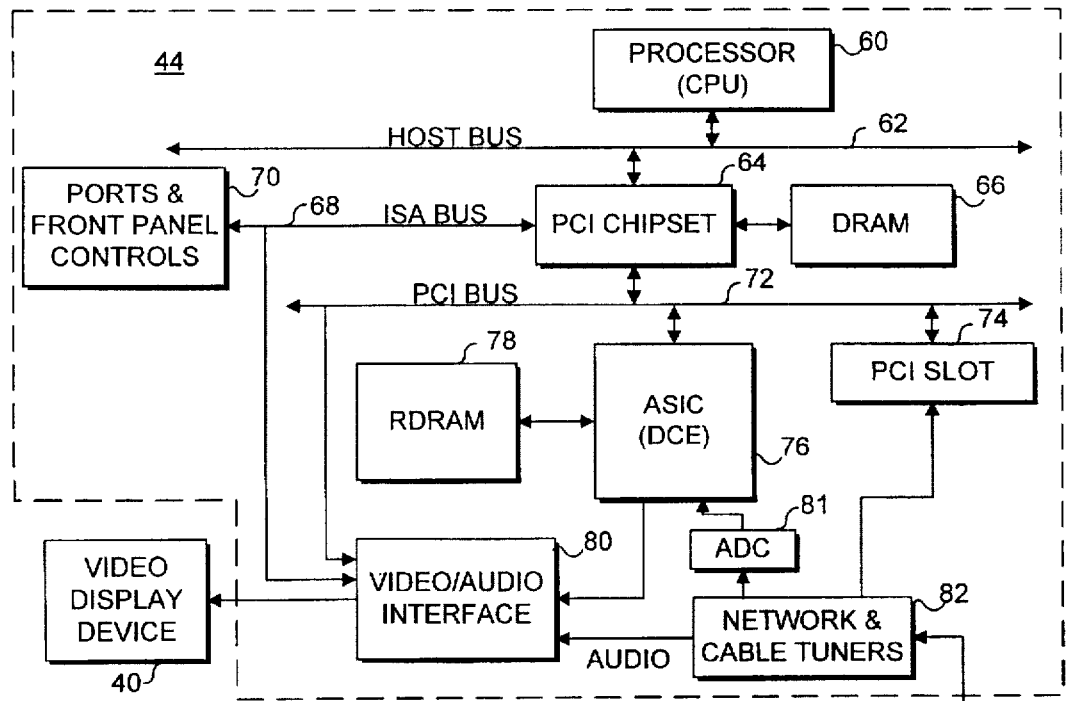
FIG. 2 is a schematic block diagram of the set top box in which the present invention is implemented to enable access of image data as if stored in memory in different color formats.

Further details of the circuitry within set top box 44 are shown in FIG. 2. The set top box is controlled by a central processing unit (CPU) 60. An operating system comprising machine instructions controls the CPU when the set top box is initially energized or reset. The CPU also executes machine instructions comprising application software programs that are loaded into it as described above.

CPU 60 is coupled to a host bus 62, which is connected to other components in the chip setbox, including a peripheral component interface (PCI) chip set 64. The PCI chip set is commonly provided on personal computers and provides for fast data transfer between the host bus and a PCI bus 72 so that data are moved efficiently between other components of the set top box and CPU 60. In addition, PCI chip set 64 is coupled to a conventional industry standard architecture (ISA) bus 68 (much slower than the PCI bus) through which are connected input/output ports and set top box controls, as indicated in a block 70. Dynamic random access memory (DRAM) 66 is also connected to the PCI bus, providing volatile storage for data and for machine instructions used to control processor 60.

PCI bus 72 is Coupled to a PCI slot 74 and to an application specific integrated circuit (ASIC) 76. ASIC 76 is connected to 16 Mbytes of rambus dynamic random access memory (RDRAM) 78. The RDRAM is used for storing image data representing objects to be displayed on the display screen of television receiver 40. Network and cable tuners 82 are connected to receive video signals from an antenna, cable, or other source of video signals. Digital data conveyed by the video signals are input to PCI slot 74 and the analog, video data are input to an analog to digital converter (ADC) 81, which converts the analog, signal to a corresponding digital signal for input to ASIC 76. The audio portion of the signal input to network and cable tuners 82 are input to a video/audio interface 80, which drives the video display device, i.e., television receiver 40.

In an NTSC hardware decoder or an MPEG hardware decoder, YCrCb pixels are input to a RGB converter, which produces corresponding RGB data that are stored in an RGB frame buffer. Similarly, in a software MPEG decoder used in products such as the VIPER™ chip, which is distributed by Tseng Corporation, a software converter is applied to convert the YCrCb data to RGB data that are stored in an RGB frame buffer. Another prior art approach used in the S3™ chip, which employs both hardware and software, provides a frame buffer for YCrCb formatted data and a frame buffer for RGB data. Men the YCrCb data are needed, a RGB converter converts the YCrCb data into RGB data; a multiplexer selectively provides either the converted data or the RGB data when required.

Figure 3:
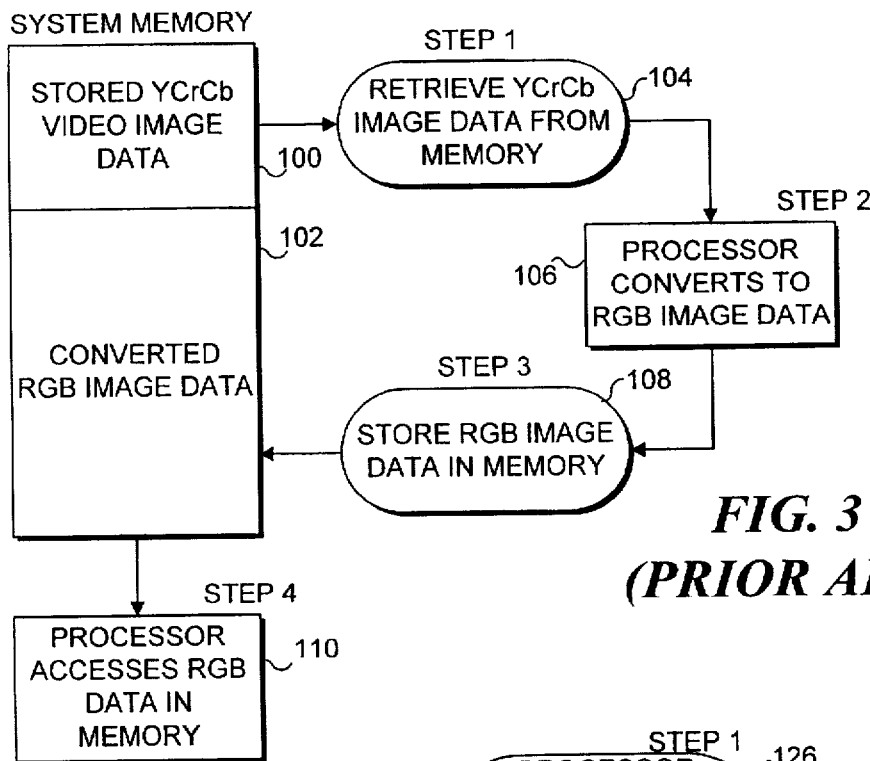
FIG. 3 is a block diagram showing a prior art approach to converting image data from one color format to another so that the data can be accessed by a processor.

Typically, as shown in FIG. 3, the conventional approach for converting a video image stored in memory from one color space or format to another involves four steps. In the Example shown, a stored YCrCb video image comprising data stored in a block 100 within system memory is retrieved from memory, as indicated in a block 104. Although these data are retrieved on a sequential basis for input to a CPU or very large scale integrated (VLSI) circuit specifically designed to carry out such conversions, the data for an entire frame are normally converted by the processor on input as indicated in a block 106. As the processor produces the converted data, which are in an RGB format that define an RGB3 color space, the image data are stored in another portion of a memory 102, as indicated in a block 108, in the native frame buffer format. In order to access the data in the RGB image format that define the RGB color space, a fourth step provides for reading the RGB data from memory, as indicated in a block 110.

There are several disadvantages to the prior art approach, as noted above in the Background of the Invention. Even using an VLSI circuit dedicated to carrying, out the conversion process, substantial time is required to convert from color space to another. In addition, the image data defining both color spaces are typically stored in memory for the entire frame, thereby using a substantial amount of memory to enable the processor to access the data for even a single pixel. Although it is possible to convert the data for only one pixel from one color space to another, it is much more common to convert an entire frame from one color space to a desired color space, in order to enable immediate access of any portion of the image data in the desired color format.

In contrast, FIG. 4 shows the steps taken to access two pixels of an image in RGB format in accordance with the present invention, when the image data for a frame are actually stored in YCrCb color format in a system memory address space 120. Within the YCrCb color space, a first pixel that is to be referenced is stored at an address 0x2100. Thle color format data for a first pixel, which is one of a pair of pixels, includes a luminance value $Y_0$ and a blue chrominance Cb. The data for the second pixel of the pair is stored at an address 0x2102 and includes data defining the red chrominance value for the pixel pair and a value $Y_1$ for the luminance of this pixel. The data for these two pixels comprising the pair are referenced respectively by numerals 122 and 124 in the drawing.

In the present invention, access to the RGB color space is made as if image data in the RGB format were actually stored in system memory for tile entire frame. The process begins, as indicated in a block 126 when the processor "accesses" a portion of the RGB image data in a color conversion memory space. The color conversion memory is an alternate memory, since it does not physically exist within any memory device. To enable the processor to access data in the RGB image format from the color conversion address space, a corresponding portion of the YCrCb image data is retrieved from system memory. Thus, for the Example shown in FIG. 4, RGB format data for pixels at color conversion address spaces 128 and 130 are accessed, and these pixels correspond to the YCrCb color format data at locations 122 and 124.

To determine the address in system memory corresponding to the pixels accessed in the color conversion memory space, a fixed offset is subtracted from the address of the RGB data. In the preferred embodiment, this fixed offset is equal to 0x4000000. Furthermore, because the RGB pixels are 32-bits wide while the YCrCb pixels are only 16-bits wide, the color conversion address space range required for this data is twice as large as the corresponding system memory address space. Accordingly, after subtracting the fixed offset from the address in the color conversion address space, the result must be divided by two to obtain the address of the YCrCb color format data for the corresponding pixels stored in system memory 120. Finally, as noted in a block 134, the YCrCb color format data that have been retrieved from system memory in a block 132 are converted to RGB image data are delivered to the processor for use, just as if the RGB color space image data had been returned by directly accessing the data from address in the color conversion space. Preferably, the RGB color space image data are also stored in processor buffer for subsequent use by the processor.

Conversion of the YCrCb color image data (in 4:2:2 form) to R, G, and B values are carried out as indicated in the following three equations.

$$R = 1.164 \times (Y_x - 16) + 1.596 \times (Cr - 128) \quad (1)$$

$$G = 1.164 \times (Y_x - 16) - 0.813 \times (Cr - 128) - 0.391 \times (Cb - 128) \quad (2)$$

$$B = 1.164 \times (Y_x - 16) + 2.018 \times (Cb - 128) \quad (3)$$

where $Y_x$ is the luminance of the $x_{th}$ pixel for which the color format data are being converted, Cr is the red chrominance value for the pixel (applied to the pair of pixels), and Cb is the blue chrominance value for the pixel (applied to the pair of pixels).

CPU 60 can issue a request to access 32 bits to obtain color format data for a single RGB pixel. Alternatively, access of 64 bits can be requested by the CPU to obtain two RGB pixels without any performance penalty, since the YCrCb color format data are stored as pixel pairs. Actually, the CPU can issue a cache block read to obtain RGB color format data for a total of eight pixels, since a full cache block is read and converted and then stored in the processor interface read buffer regardless of whether the RGB data for one to eight pixels is accessed by the CPU.

An overview of the steps executed in accordance with the present invention is provided in FIG. 5, beginning at a start block 140. In a block 142, image data in a particular format such as YCrCb 4:2:2 are stored in system memory at the time that an image frame is acquired. Acquisition of an image frame can occur when an analog NTSC broadcast signal is "grabbed" and digitized. Next, as provided in a block 144, the system requests access to from one to eight pixels of image data. As noted above, eight pixels of data comprising a cache block will be accessed, regardless of the number of pixels requested. A decision block 146 determines if the data address to which the system request is directed is in the color conversion memory space. If not, the system directly accesses the image data for the requested one or more pixels in YCrCb color format, since this image data are stored in system memory rather than in the color conversion memory space. The accessed YCrCb format image data are thus returned as output data in accord with a block 148. However, if the data address of the pixels requested by the system is within the color conversion memory space (alternate memory), a block 150 provides for determining the corresponding system memory address for the requested pixels. The system memory address is equal to the color conversion address divided by two minus the predetermined offset. A block 152 then provides for converting the YCrCb image data stored at the system memory address determined in block 150, which correspond to the requested RGB image data. The converted data are then provided as output data. Finally, in a block, 154, the output data produced either in block 148 or in block 152 are delivered to the processor for its use (and are also preferably stored in the processor interface read buffer, making the output data available for subsequent access directly by the processor). The procedure terminates in a block 156 (or alternatively, loops back to block 144 to access other pixels).

In the event that the system next produces a request to access pixels in RGB format that are within the range of pixels already stored in the processor interface read buffer, the color format data are directly accessed from the buffer, avoiding the need to repeat the procedure described above.

Although RGB data are accessed in the preceding, example, as if stored in real memory by mapping a reference to the RGB data to corresponding data in the YCrCb color format, it will be appreciated that the same approach can be used for accessing data in other color formats corresponding to image data stored in the YCrCb and other color formats. Since to the system, the alternative color format data appears to be stored in physical memory, access of that data is achieved for use in applications in a relatively seamless manner, just as if the requested color space data were in fact stored in physical memory. Furthermore, since only a small amount (e.g., a cache block) of data is stored in the processor read buffer, there is no requirement to use system memory to store a complete frame of converted data that is in the alternative color format, as is the case in the typical prior art approach to this matter. The present invention is thus substantially more efficient and requires much less memory, enabling the system to operate with less memory than the conventional approach would permit. It is also contemplated that the present invention can be applied for storing and accessing other types of data.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for selectively accessing image data in a plurality of different color formats, comprising the steps of:
   (a) storing image data having a first color format in a physical, real memory, said real memory having a defined range of addresses;
   (b) establishing an alternate memory space that is not contained in any physical memory, said alternate memory space having a defined range of addresses associated with each of the other of the plurality of different color formats except the first color format, each of said defined range of addresses for said alternate memory space being outside the defined range of addresses of the real memory;
   (c) specifying an address for a portion of the image data that is within one of the defined range of addresses associated with a desired color format, in the real memory if the first color format is desired, and in the alternate memory space if one of the plurality of color formats other than the first color format is desired;
   (d) if the address that was specified is not within the real memory:
      (i) as a function of the address that was specified in the alternate memory space, determining a corresponding address in the real memory of the portion of the image data; and
      (ii) converting the portion of the image data stored at said corresponding address in the real memory from the first color format to the desired color format, producing output data;
   (e) else, retrieving the portion of the image data stored at the address specified, which is in the first color format, as the output data; and
   (f) storing the output data in a buffer for subsequent access and use, any output data produced by converting the portion of the image data stored in the real memory thereby appearing to have been physically stored simultaneously at the address that was specified in the alternate memory space.

2. The method of claim 1, wherein an address in the alternate memory space comprises a fixed offset from a corresponding address in the real memory.

3. A method for selectively accessing image data in two different color formats, comprising the steps of:
   (a) storing image data having a first color format in a physical, real memory, said real memory having a defined range of addresses;
   (b) establishing an alternate memory space that is not contained in any physical memory, said alternate memory space having a defined range of addresses associated with a second color format, said defined range of addresses for said alternate memory space being outside the defined range of addresses of the real memory;

(c) specifying an address for a portion of the image data that is within the defined range of addresses of the real memory if the first color format is desired, and in the defined range of addresses of the alternate memory space if the second color format is desired;

(d) if the address that was specified is not within the real memory:

(i) as a function of the address that was specified in the alternate memory space, determining a corresponding address in the real memory of the portion of the image data; and (ii) converting the portion of the image data stored at said corresponding address in the real memory from the first color format to the second color format, to produce output data;

(e) else, retrieving the portion of the image data stored at the address specified, which is in the first color format, as the output data; and (f) returning the output data for use, any output data produced by converting the portion of the image data stored in the real memory thereby appearing to have been physically stored simultaneously at the address that was specified in the alternate memory space.

4. The method of claim 3, further comprising the step of storing the output data in a buffer for subsequent access and use.

5. The method of claim 4, wherein the buffer comprises a processor interface buffer.

6. The method of claim 3, wherein the first color format defines color using luminance, blue chrominance, and red chrominance (YCrCb) data, and said second color format defines color using red-green-blue (RGB) data.

7. The method of claim 3, wherein the defined range of addresses in the alternate memory space is substantially larger than the defined range of addresses in the real memory, because the image data in the first color format is more compact than the image data in the second color format.

8. The method of claim 3, wherein if the desired color format is the second color format, the portion of the image data in the real memory is automatically converted to a full cache block of the second color format to produce the output data.

9. The method of claim 3, wherein to determine the corresponding address of the portion of the image data in the real memory, the address of the portion of the image data in the alternate memory space is mapped to the real memory by applying a predefined offset.

10. The method of claim 9, wherein a multiplication factor is applied to the address of the portion of the image data in the alternate memory space before applying the predefined offset, said factor compensating for differences in the size of the image data in the first color format and the second color format.

11. The method of claim 3, wherein image data for a predefined number of pixels of an image are converted from the first color format to the second color format to access the portion of the image data in the second color format.

12. A system for selectively accessing image data in a plurality of different color formats, comprising:

(a) a physical, real memory for storing image data and machine instructions, said real memory having a defined range of addresses;

(b) a processor coupled to the memory and having a buffer, said processor executing the machine instructions stored within the memory to implement the following functions:

(i) storing image data having a first color format in the real memory;

(ii) establishing an alternate memory space that is not contained in any physical memory, said alternate memory space having a defined range of addresses associated with each of the plurality of color formats except the first color format, each of said defined range of addresses for said alternate memory space being outside the defined range of addresses for the real memory;

(iii) detecting specification of an address for a portion of the image data that is within one of the defined range of addresses associated with a desired color format, said defined range of addresses specified being in the real memory if the first color format is desired, and in the alternate memory space if one of the plurality of color formats other than the first color format is desired;

(iv) if the address that was specified is not within the real memory:

(1) as a function of the address that was specified in the alternate memory space, determining a corresponding address of the portion of the image data stored in the real memory; and (2) converting the portion of the image data stored it said corresponding address in the real memory from the first color format to the desired color format to produce output data;

(v) else, retrieving the portion of the image data in the first color format, which is stored at the address specified, as the output data; and (vi) returning the output data for use by the processor, any output data produced by converting the portion of the image data stored in the real memory thereby appearing to have been physically stored simultaneously at the address that was specified in the alternate memory space.

13. The system of claim 12, wherein an address in the alternate memory space comprises a fixed offset from a corresponding address in the real memory.

14. A system for selectively accessing image data in two different color formats, comprising:

(a) a physical, real memory for storing image data and machine instructions, said real memory having a defined range of addresses;

(b) a processor coupled to the memory, said processor executing the machine instructions stored within the memory to implement the following functions:

(i) storing image data having a first color format in the real memory;

(ii) establishing an alternate memory space that is not contained in any physical memory, said alternate memory space having a defined range of addresses that are associated with a second color format, said defined range of addresses of said alternate memory space being outside the defined range of addresses of the real memory;

(iii) detecting specification of an address for a portion of the image data that is within the defined range of addresses of the real memory if the first color format is desired, and in the defined range of addresses of the alternate memory space if the second color format is desired;

(iv) if the address that was specified is not within the real memory:

(1) as a function of the address that was specified in the alternate memory space, determining a corresponding address of the portion of the image data stored in the real memory; and (2) converting the portion of the image data stored at said corresponding address in the real memory from the first color format to the second color format, producing output data;

(v) else, retrieving the portion of the image data in the first color format, which is stored at the address specified in the real memory, as the output data; and (vi) making the output data available for use by the processor, any output data produced by converting the portion of the image data stored in the real memory thereby appearing to have been physically stored simultaneously at the address that was specified in the alternate memory space.

15. The system of claim 14, further comprising the step of storing the output data in a buffer for subsequent access and use by the processor.

16. The system of claim 14, wherein the first color format defines color using luminance, blue chrominance, and red chrominance (YCrCb) data, and said second color format defines color using red-green-blue (RGB) data.

17. The system of claim 14, wherein the defined range of addresses in the alternate memory space is substantially larger than the defined range of addresses in the real memory, because the image data in the first color format are more compact than the image data in the second color format.

18. The system of claim 14, wherein if the desired color format is the second color format, a full cache block containing the portion of the image data in the real memory is atomatically converted to the second color format to produce the output data.

19. The system of claim 14, wherein to determine the corresponding address of the portion of the image data in the real memory, the address of the portion of the image data in the alternate memory space is mapped to the real memory by applying a predefined offset.

20. The system of claim 19, wherein a multiplication factor is applied to the address of the portion of the image data in the alternate memory space, said factor compensating for differences in the size of the image data in the first color format and the second color format.

21. The system of claim 14, wherein image data for a predefined number of pixels of an image are automatically converted from the first color format to the second color format to access the portion of the image data in the second color format.

22. A system for selectively accessing image data, in one of two color formats, comprising:

(a) a system memory for storing machine instructions and including a system memory address space for storing image data in a first color format;

(b) a processor, coupled to the system memory, and responding to the machine instructions to provide a color conversion address space for nominally storing image data in a second color format, said color conversion address space being outside the system memory address space and not contained in any physical memory; and (c) means responsive to a request for access to the image data nominally stored in the color conversion address space in the second color format, for accessing corresponding image data stored in the system memory address space and converting said corresponding image data from the first color format to the second color format, for use by the processor, said means providing access to the image data in the second color format as if said image data were stored in a physical memory instead of within the color conversion address space.

* * * * *